US007983264B2

(12) United States Patent
Etheridge (10) Patent No.: US 7,983,264 B2
(45) Date of Patent: Jul. 19, 2011

(54) ACCESS CONTROL LIST MANAGEMENT SYSTEM

(75) Inventor: James K Etheridge, Helena, AL (US)

(73) Assignee: Cyber Operations, Inc., Pelham, AL (US)

( * ) Notice: Subject to any disclaimer, the term of this patent is extended or adjusted under 35 U.S.C. 154(b) by 846 days.

(21) Appl. No.: 11/842,563

(22) Filed: Aug. 21, 2007

(65) Prior Publication Data

US 2009/0052451 A1    Feb. 26, 2009

(51) Int. Cl.
*H04L 12/28* (2006.01)
*H04L 12/56* (2006.01)
*G06F 7/04* (2006.01)
*G06F 15/16* (2006.01)
*G06F 17/30* (2006.01)
*H04L 29/06* (2006.01)
*H04N 7/16* (2006.01)

(52) U.S. Cl. .............................. 370/392; 726/13; 726/27

(58) Field of Classification Search ..................... None
See application file for complete search history.

(56) References Cited

U.S. PATENT DOCUMENTS

| | | | | |
|---|---|---|---|---|
| 6,289,458 | B1 * | 9/2001 | Garg et al. | 726/21 |
| 6,449,728 | B1 * | 9/2002 | Bailey | 713/503 |
| 6,651,096 | B1 * | 11/2003 | Gai et al. | 709/223 |
| 6,963,906 | B2 * | 11/2005 | Portuesi | 709/217 |
| 7,133,914 | B1 * | 11/2006 | Holbrook | 709/224 |
| 7,636,937 | B1 * | 12/2009 | Bhattacharya et al. | 726/2 |
| 2006/0075499 | A1 * | 4/2006 | Edwards et al. | 726/24 |
| 2008/0034092 | A1 * | 2/2008 | Kikuchi et al. | 709/225 |
| 2008/0313459 | A1 * | 12/2008 | Kwan | 713/161 |

* cited by examiner

*Primary Examiner* — Nittaya Juntima
*Assistant Examiner* — Xavier Szewai Wong
(74) *Attorney, Agent, or Firm* — Smith, Gambrell & Russell

(57) ABSTRACT

An Access Control List management tool for use in distributed communications networks, compares Access Control Entries for conflicts and optimizes the ACE order by frequency of use, thus by detecting errors in the construction of ACLs and reducing the number, on average, of access entries that must be maintained and processed greatly improves the efficiency of transfers.

5 Claims, 6 Drawing Sheets

Real-time Access List Optimization

ACCESS CONTROL LIST MANAGEMENT SYSTEM

BACKGROUND

Computer networks are tools by which data may be transferred from one computer system to another. This data is usually transmitted in the form of data packets, which have embedded in them the network address of both the source and destination systems. By deconstructing the network address of the destination, devices known as routers are used to send each packet closer to its final destination.

In the network known as the Internet, these network addresses are known as Internet Protocol (IP) Addresses. IP addresses, in their human-readable representation (also known as dot notation), consist of four decimal values from 0 up to and including 255 separated by periods. In their machine representation, IP addresses are a 32-bit word.

Other protocols are typically embedded in the IP protocol. One of these is TCP, which uses a port number to distinguish services and individual streams of data. Port numbers may be any number from 1 up to 65535, with the first 1023 being assigned specific tasks. Web browsing, for instance, uses the HTTP protocol on port 80 while email transfers use the SMTP protocol on port 25.

Although the primary purpose of routers is to facilitate the transfer of data on the internet, they are also used to control access. Each physical connection from the router is known as an interface, and routers typically contain tables of rules which specify through which interface, if any, a particular data packet should be sent. One kind of table is known as an Access Control List or an Action Control List, both hereinafter refereed to as an ACL, which contains Access Control Entries (ACEs).

Access control lists provide a mechanism to match either the source address, the destination address, and/or the protocol of an incoming packet, with a directive describing what should be done with a matching packet. Though ACLs are non-homogenous across platforms, they always have an option to allow or deny a matching packet. Some router systems may also have the option to limit the rate of matching packets, or to forward the packets to an alternate interface. ACLs are evaluated in-order, so that the first matching ACE determines the destiny of the packet. The comparison of ACE's within ACL's is well known in terms of whether the comparison is done by software, hardware, or a hybrid system, therefore a discussion of basic ACE comparison modalities is not included herein, other than noting that the basic system requirements for interaction include a programmable processor for executing a software program to implement the instant method, a memory for storing and manipulating ACL's and their constituent ACE's and a user interface, preferably including a screen for the user to view the ACL or individual ACE.

The matching of IP addresses is done through a netmask, which looks much like an address in its dotted notation. In its underlying machine representation, however, a netmask consists of a 32-bit word that typically has only its most significant bits set. The function of the netmask is to define a range of IP addresses that are considered to be a common network.

In medium to large organizations, ACLs may become extremely large, and the difficulty of maintaining the lists increases geometrically as the number of entries grows. Large ACLs also take more time to process, slowing down the data transfer rate across the router. The size of the ACL, therefore, should be kept as small as possible. The following is an example of an excerpt form typical ACL which in fact contains many more ACEs. Certain ACEs have been adjusted for illustration purposes:

| Entry 1: | deny | ip 88.0.0.0 | 7.255.255.255 |
|---|---|---|---|
| Entry 2: | deny | ip 96.0.0.0 | 31.255.255.255 |
| Entry 3: | deny | ip 169.254.0.0 | 0.0.255.255 |
| Entry 4: | deny | ip 172.0.0.0 | 0.255.255.255 |
| Entry 5: | deny | ip 172.16.0.0 | 0.0.255.255 |
| Entry 6: | deny | ip 192.0.2.0 | 0.0.0.255 |
| Entry 7: | permit | ip 192.0.0.0 | 0.255.255.255 |
| Entry 8: | deny | ip 192.168.0.0 | 0.0.255.255 |
| Entry 9: | deny | ip 197.0.0.0 | 0.255.255.255 |
| Entry 10: | deny | ip 198.18.0.0 | 0.1.255.255 |
| Entry 11: | deny | ip 201.0.0.0 | 0.255.255.255 |
| Entry 12: | deny | ip 222.0.0.0 | 1.255.255.255 |
| Entry 13: | deny | ip 224.0.0.0 | 31.255.255.255 |
| Entry 14: | deny | all others. | |

Managing large access control lists brings many challenges. Matching access control entries takes time, so a poorly structured ACL may severely impact network performance. As well, for every ACE added to the list, the likelihood of conflicts between entries within the same list increase. These conflicts may take three forms.

The first kind of conflict is called a shadowed ACE, which means that the matching rules of the ACE are a subset of the matching pattern of a previous ACE and their directives are different. An ACE may become shadowed, for instance as in the ACL above, looking at the ACEs referring to a designation starting with 192. If an ACE accepts packets with a destination starting with 192 and a later ACE denies packets with a destination starting with 192.168. In this case, the latter ACE will never be reached. Shadowing is the most severe kind of conflict, as it may cause inadvertent security holes (in the case of a mistaken access), or a loss of service (in the case of a mistaken denial). In this regard note that with respect to the last two ACEs directed to the destination starting with 192, the denial of 192.168.0.0 will be ineffective.

The second kind of conflict is called forward redundancy. A forward redundancy is created when the matching rules of an ACE are a subset of the matching pattern of a previous ACE and their directives are the same. In this case, the latter ACE is rendered useless by the former ACE, as the pattern will never match while processing a packet. An example of forward redundancy in the ACL segment above is illustrated by the ACE which denies a packet with an address starting with 172 and a later ACE which denies a packet with a destination of 172.16, the latter ACE is useless.

The third kind of conflict is called backward redundancy. ACEs are backward redundant when the matching rules of the ACE are a subset of the matching pattern of a subsequent ACE, the directives are identical, and there is no pattern between them which has a different directive and is a subset of the ACE. The later ACE is essentially making the former ACE useless. As an example, if an ACE accepts packets starting with 192.0.2.0 and later the ACE accepts packets starting with 192, then the first entry is redundant.

Of these three, backward redundancy is the least harmful, as the more precise rule could have been inserted intentionally as an optimization procedure.

Managing large access control lists is an onerous and error-prone task. The order of ACEs in the ACL become more important and their relationship becomes more complicated. The likelihood of conflicts within an ACL increases geometrically with size. Conflicts within an ACL may cause security breaches, loss of service, decreased data throughput and increased latency.

Another specific problem is caused by lengthy ACL's. Each network packet is processed through the ACL until a match is made. The comparison between the packet and the ACL entry requires a measurable amount of time for each packet and ACE. The amount of time to process the packet through the ACL is the sum of each of the ACE comparisons. If the average time to process a packet through and ACL is greater than the average time between packets entering the router, then the router cannot process all of the packets effectively. The router must then choose to drop the unfiltered packets (obviously this causes network problems or outages) or the router may choose to pass the unfiltered packets which may have a worse effect than dropping them as it gives the network clients no protection at all.

SUMMARY OF THE INVENTION

Previous to this invention, determining the effectiveness of an ACL and optimizing it for efficiency and correctness was extremely time-consuming and error-prone. Finding conflicts was a matter of manually scanning the list and relying on memory or notes. ACLs were often left in an extremely suboptimal state simply from the difficulty of managing them.

This invention, by detecting errors in the construction of ACLs and reducing the number, on average, of access entries that must be maintained, represents an enormous benefit to society. It contributes to cost savings and lessens the load on large networks. It also frees IT personnel for more important work.

By increasing the averaging processing speed of each packet through the ACL, the invention increases the overall number of packets that can be processed and also increases the number of ACE's that may safely be used in a given router. The automatic speed optimization also relieves human workers of perhaps the most difficult aspect of access list management.

BRIEF DESCRIPTION OF THE DRAWINGS

The method and apparatus utilized in the invention is depicted in the accompanying drawings which form a portion of this disclosure and wherein.

DESCRIPTION OF THE PREFERRED EMBODIMENT

As noted above and as illustrated in FIG. 1, it will be understood that there will be at least a programmable processor 10 configured to execute the comparison algorithm as herein described and a memory 12 for retaining at least the ACL under investigation. Further, a user interface 14 including a screen and user input components will be utilized. The processor, memory and interface comprise and editing station 16, however, it is to be understood that the editing station need not be a stand alone station but may be derived from existing hardware components in a computer network. Editing station 16 will be connected to the network such that modified ACLs can be transferred to selected routers.

Figure 1:
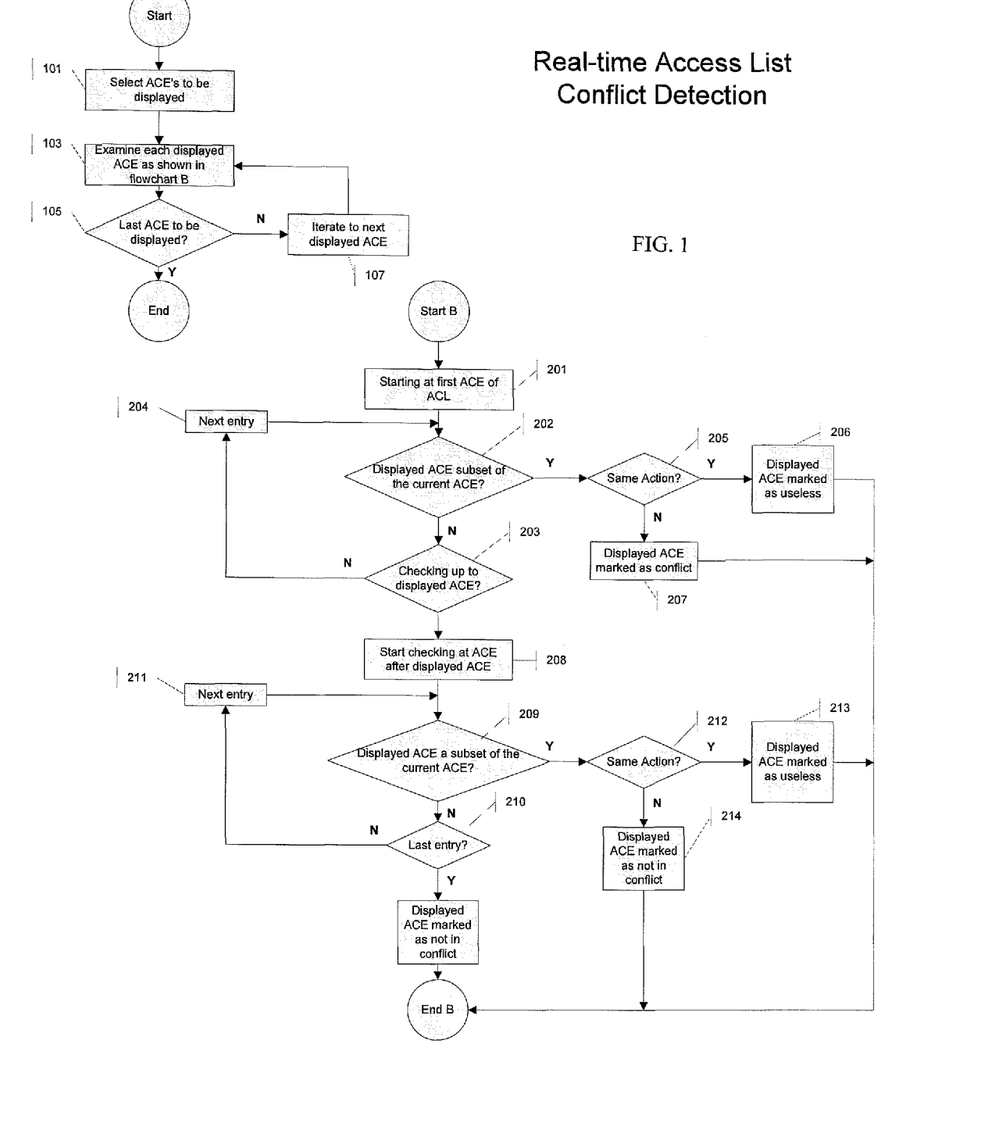
FIG. 1 is a schematic diagram showing the basic set up of the physical components.

It is to be understood that the algorithm may be embedded in a program which manages access control lists and provides an access control view and an access control entry editor. When identified, conflicting access control entries may be highlighted on the screen of user interface 14. The highlighting may take the form of changing the colors of the entry text or by introducing some other visual cue that the entry is conflicting with another. In addition, further information regarding the conflict may be displayed either on the access control list view or the access control entry editor. This conflict notification occurs in real-time, as a user is editing the ACL or ACE. The detection and notification works as follows:

The user selects the ACE's that will be displayed on the screen and concomitantly analyzed by the program.

1) The selected entries are checked for conflicts, one by one, in the following manner:
   a) Starting from the beginning of the ACL, each subsequent ACE is compared sequentially with the first ACE designated on the TEST ACE. Once comparison with the first ACE terminates as described hereinafter the comparison begins anew with the next available ACE which becomes the TEST ACE and subsequent ACEs are compared to it. This iteration continues until all of the selected ACE's have been compared and reduced. Thus, there will be a TEST ACE and a subsequent ACE which is compared to the TEST ACE until the process is completed.
   b) If the set of packets that can potentially match the subsequent ACE is a subset of the set of packets that can potentially match the TEST ACE, and the action is the same, then the subsequent ACE is considered to be useless, and the search terminates. If the set of packets that can potentially match the TEST ACE is a subset of the set of packets that can potentially match the subsequent ACE, and the action is the same, then the subsequent ACE is considered to be useless, and the search terminates.
   c) If the search pattern of the TEST entry is a subset of the subsequent ACE, and the action is different, then the subsequent ACE is considered to be in conflict, and the search for conflicts terminates.
   d) Then, each ACE is compared with the TEST ACE starting from the ACE after the TEST ACE.
   e) If the ACE is a subset of the TEST ACE, and the action of both ACEs are the same, then the entry renders the TEST ACE useless, and the search terminates.
   f) If the ACE intersects the current TEST entry and the action of both ACEs are different, then the TEST entry is not useless and the search terminates.
   g) If none of these conditions were found, the TEST entry is considered to be not in conflict.
2) If a conflict is found, the color or icon indicating the conflict is added to the display of the entry.

Figure 2:
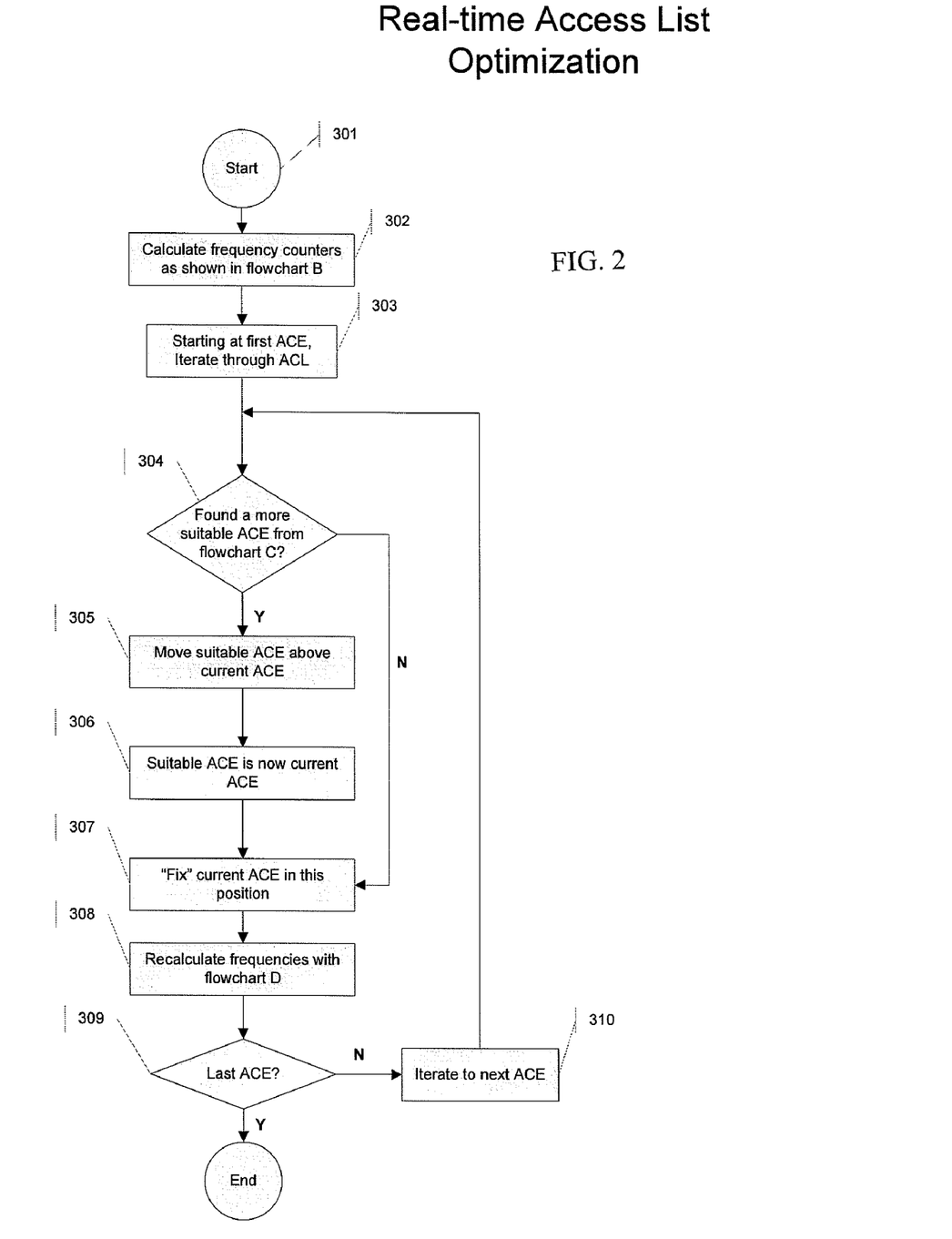
FIG. 2 is a flow chart of the ACL conflict resolution method.

In order to save administration time, the process of resolving conflicts may be executed automatically, by removing all redundant entries with a single user interaction. This may greatly increase the throughput of the router, saving both wasted cpu cycles and power. This process is shown in the flow chart illustrated in FIG. 2. As may be seen, the user interacts with the system to select and display the access control list entries to be managed in step 101. By way of illustration, assume the ACL segment set forth in the background are the selected entries which are displayed as follows:

| Entry 1: | deny | ip 88.0.0.0 | 7.255.255.255 |
| Entry 2: | deny | ip 96.0.0.0 | 31.255.255.255 |

-continued

| Entry 3:  | deny   | ip 169.254.0.0 | 0.0.255.255   |
| Entry 4:  | deny   | ip 172.0.0.0   | 0.255.255.255 |
| Entry 5:  | deny   | ip 172.16.0.0  | 0.0.255.255   |
| Entry 6:  | deny   | ip 192.0.2.0   | 0.0.0.255     |
| Entry 7:  | permit | ip 192.0.0.0   | 0.255.255.255 |
| Entry 8:  | deny   | ip 192.168.0.0 | 0.0.255.255   |
| Entry 9:  | deny   | ip 197.0.0.0   | 0.255.255.255 |
| Entry 10: | deny   | ip 198.18.0.0  | 0.1.255.255   |
| Entry 11: | deny   | ip 201.0.0.0   | 0.255.255.255 |
| Entry 12: | deny   | ip 222.0.0.0   | 1.255.255.255 |
| Entry 13: | deny   | ip 224.0.0.0   | 31.255.255.255|
| Entry 14: | deny   | all others.    |               |

Step 103 initiates subroutine B, thus if Entry 4 is processed as the TEST ACE according to sub routine B, the first loop would start with Entry 1 in the ACL as in Step 201, and since Entry 1 is not a subset of Entry 4, per Step 202, the routine would check to see whether the checking had progressed up to Entry 4 in step 203. Step 204 would then initiate comparing Entry 2 to Entry 4, thus by iteration the system processes all of the ACE's prior to entry 4 in the list e.g. 1, 2, 3. When the upper loop compares entry 4 to itself step 203 yields a yes response and step 208 directs that Entry 4 is compared with the entry after the current entry namely, Entry 5. Entry 4 is not a subset of Entry 5 per step 209, thus the next entry loop proceeds to check Entry 4 against Entries 6-13. When subroutine B terminates, step 105 queries whether the Entry was the last entry to be displayed. Since Entry 4 was not the last entry subroutine B is started again with Entry 5 becoming the TEST ACE defining the search pattern against which the ACL is compared. Entries 1-3 are compared sequentially, but since none of them are subsets, the comparison progresses through the loop until step 204 brings Entry 4 up for comparison. Since Entry 5 is a subset of Entry 4 and dictates the same action, per step 205 Entry 5 is marked as useless in step 206 and subroutine B terminates. Step 105, queries as to last entry, step 107 increments to the next entry, Entry 6 and subroutine B begins the comparison of the first 5 entries and Entry 6. Because Entry 6 is not a subset of any of Entries 1 to 5, step 203 and 208 cause the lower loop to begin comparison at Entry 7. Entry 6 is a subset of Entry 7 thus step 212 checks the entries for the same action. Step 212 reveals that the Entries do not require the same action therefore step 214 requires that Entry 6 be marked as not in conflict and subroutine B terminates. Again, Step 105 queries as to last entry and step 107 increments to Entry 7. Because Entry 7 is not a subset of entries 1 to 6, step 208 is reached and Step 209 reveals that Entry 7 is not of subset of entries 8 through 14. Again, Step 105 queries as to last entry and step 107 increments to Entry 8. Because Entry 8 is not a subset of entries 1 to 6 but is a subset of entry 7, step 205 is reached and Step 207 reveals that they are conflicting and that Entry 8 is shadowed by Entry 7 and the entries are so marked and the subroutine stops and subroutine B terminates. The entry is incremented and the comparison is made with ACE 9 to 11 none of which are subsets of any other ACE. Step 105 continues to check until the last entry to be displayed is found, at which point the comparison stops and the user is presented with a screen display with a number of entries highlighted. For example, Entry 5 is highlighted as USELESS either by font or color and Entry 8 is highlighted as in conflict. User can elect to delete all USELESS entries simultaneously or one by one and may resolve the conflicts that are located. It will be seen that the machine identification of useless and conflicting Entries is limited only by the processing speed of the apparatus and the man hours necessary are greatly reduced.

This technology may also be used to determine actions which optimize the access list by changing the order of entries without affecting the intended operation of the ACL. The most frequently matched ACE should be moved as close to the beginning of the list as possible. That is to say this technology can be used to determine which ACE in an ACL is the most used ACE based on network traffic flow and the ACL can thus be rearranged such that the most often used ACE's appear first thereby increasing the efficiency of the ACL. This optimization may be accomplished by the following algorithm:

1) Using a large sample of network traffic, obtained either from a file or from real-time analysis, occurring substantially concurrently with movement of traffic across said network each packet is filtered using the access list. During the filtering of the packet, a frequency counter attached to each access control entry is incremented when the entry's pattern is compared against and matches the signature of the packet.
2) For each access control entry, starting at the most frequently used ACE in the ACL designated as the Alpha ACE and then iterating over ACEs in descending order of their frequency counters, a search is performed for an ACE which has both a higher frequency and a lower position in the ACL than the Alpha ACE. During this search, if any entry between the two intersects with the Alpha ACE and has a different action, the search for a more suitable ACE continues with the next most frequently used ACE.
3) If a suitable ACE is found during the search, it is removed from its position and placed in a position in the ACL immediately preceding the ACE under consideration. A flag is set on the recently moved ACE to indicate that it is "fixed" and may not be moved again. If a suitable ACE is not found then the Alpha ACE under consideration is "fixed" and may not be moved again.
4) When the search is concluded or aborted, all the entries succeeding the "fixed" ACE are modified according to the following:
    a) If the ACE is a subset of the "fixed" ACE under consideration, its frequency counter of the subsequent ACE is set to 0, as it will no longer be reached by any of the packets in the sample.
    b) If the "fixed" ACE under consideration is a subset of the subsequent ACE, the subsequent ACE's frequency counter is decremented by the "fixed" ACE's frequency counter value, since the subsequent ACE will have its frequency reduced by the number of packets that match the "fixed" ACE.
    c) If the "fixed" ACE under consideration and the subsequent ACE overlap each other without either being a subset of the other, it is added to a list of intersections.
5) If any intersections were found, the frequency counters for the ACL is re-evaluated as follows:
    a) The network traffic sample that does not match any previously fixed ACE is processed again through a subset of the ACL that has not yet been processed.
    b) If the packet matches the newly "fixed" ACE, then all succeeding intersections that also match the packet have their frequency counters decremented by one.

Other algorithms for speed optimizing an ACE can be used, some as simple as moving ACE's by trial and using heuristics to find better ACE ordering. The above algorithm is exact for a given packet set and is explained more fully in the following description of the Flow charts set out in FIG. 3.

Figure 3:
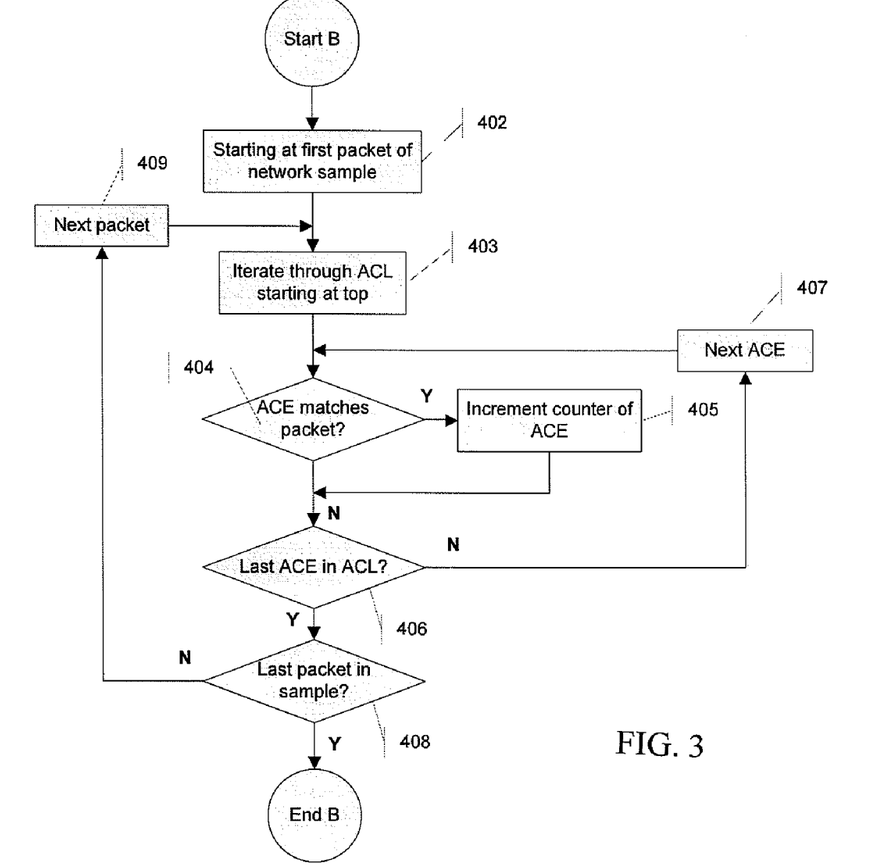
FIGS. 3 to 6 are depict a flow chart of the real time ACL optimization method.
Figure 4:
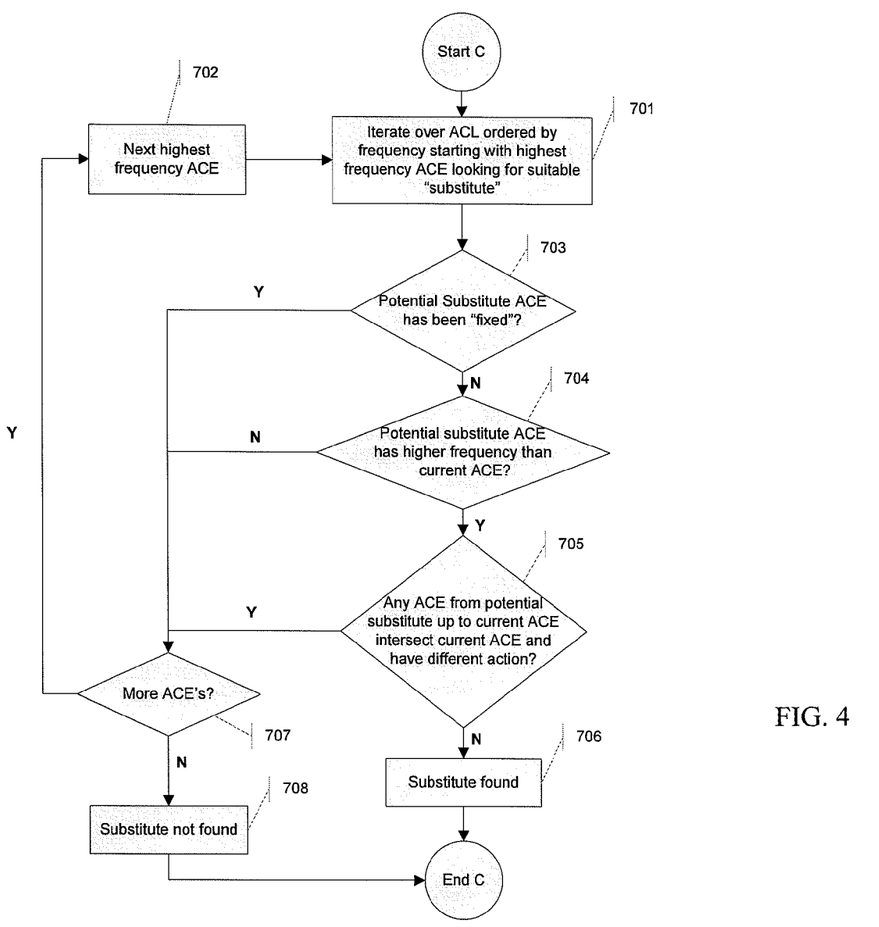
Figure 5:
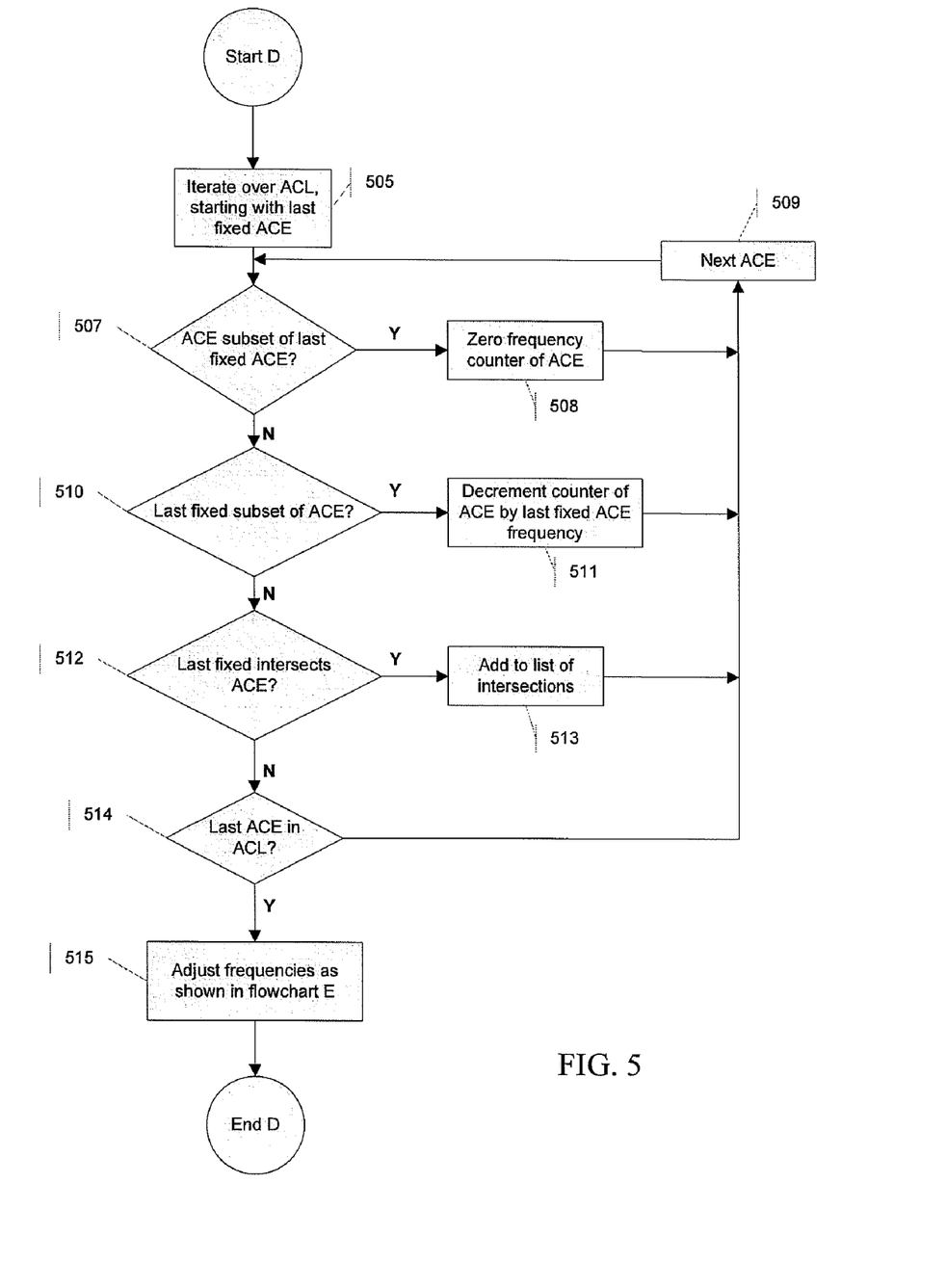
Figure 6:
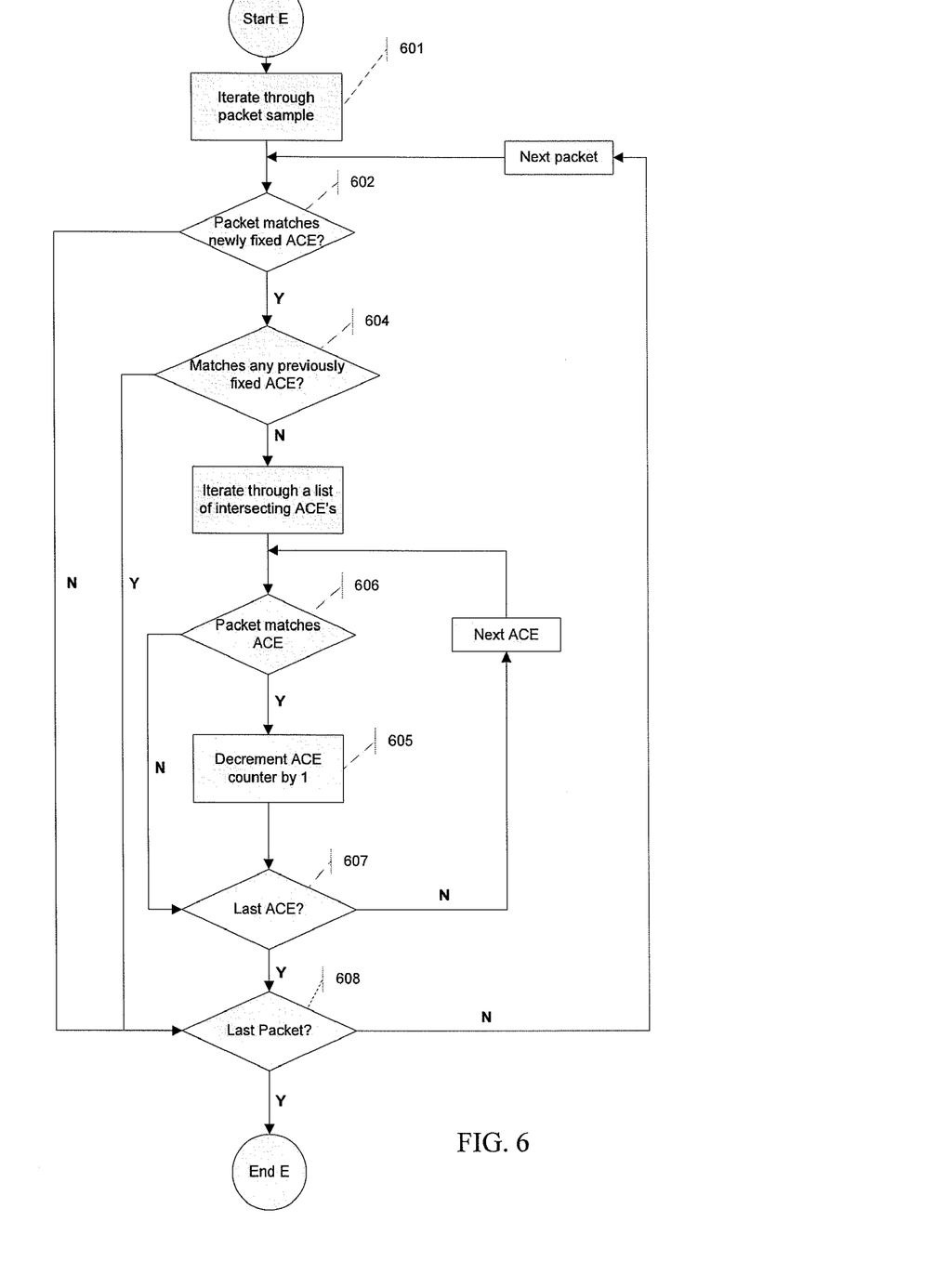

The optimization routine is initiated at step 301 and in step 302 counting subroutine B is initiated. Each ACE has a counter that is the sum of all of the matching packets that match against the ACE for each ACE that has not been 'fixed' in position in the ACL by the optimization routine. The flowchart B initializes the state machine which is all of the counters associated with the ACEs which have not been fixed.

In subroutine B at step 402 the first packet of the network sample is selected for processing through the ACL starting at the first ACE as noted at 403. If the ACE matches the packet then the attached frequency counter for the ACE is incremented in step 405 and the next ACE in the ACL is then selected at step 407 and compared to the packet at step 404. If the ACE does not match the packet and is not determined to be the last ACE in the ACL in step 406 then the next ACE is applied at step 407. This loop continues until step 406 determines that the last ACE in the ACL has been compared to the packet, at which point step 408 determines whether the packet under consideration was the last packet in the sample. If not, step 409 calls for the next packet and the process is iterated until all packets in the traffic sample have been processed by the ACL and all of the ACE's which have matched any of the packets have had their frequency counters appropriately incremented.

When subroutine B ends, Step 303 begins optimizing the ACL and starts with the first ACE. In Step 304, subroutine C is used to determine if the current ACE is the best ACE for the Alpha position or if a better substitute ACE can be found. Subroutine C starts in step 701. We begin with the highest frequency ACE that is available to be substituted and in step 703 make sure that the ACE has not already been "fixed" into place. Step 704 checks that the ACE has a higher frequency than the current Alpha ACE otherwise it would not be a better substitute. Finally, once a potential substitute has been identified, all of the entries from the substitute going up to the current ACE are compared such that if any of those ACE's intersect the current ACE and have a different action then they are not valid substitutes. If the substitute ACE is valid then 706 indicates that a substitute is found and subroutine C ends. The search continues as long as there are more ACE's to check 707 and if no substitute is found 708 then subroutine C ends.

If a more suitable ACE is found in subroutine C then it is moved just above the current ACE's position in step 304 and the Alpha position is now set to the ACE that has just been moved. The Alpha position ACE is now marked as "fixed" in step 306 and will not be moved again during the optimization procedure. The "fixed" ACE is always the current ACE or a more suitable ACE if found in subroutine C.

In order to determine the next highest-counter ACE that is allowed to be put into the current position and fix it there, then the frequency counters must be recalculated per step 308. The counters must be set such that they are of the sum of the packets matching the particular ACE that do not match any "fixed" ACEs. Subroutine D uses optimization steps for recalculation of the state machine. If an ACE is a subset of the fixed ACE, its counter can be safely set to zero in step 508. If the fixed ACE is a subset of the ACE then the ACE decrements its counter by the counter of the fixed ACE. If the ACE intersects the fixed ACE then the ACE is added to a list so that its frequencies can be adjusted later in subroutine E. The next ACE in the ACL is then compared.

Subroutine E is initiated in 515 and begins looping through the packet sample. Each packet that matches the newly "fixed" ACE 602 is then checked so that it doesn't match any other fixed ACE 604. If the packet passes those checks, it is checked against all ACE's in the intersection list. If the packet matches any of the intersection ACE's 606 then the ACE will have its counter decremented by 1. When all of the packets have been processed 608 then subroutine E ends and subroutine D ends and 308 continues until all of the ACE's in the ACL have been fixed into their optimum position. When the last ACE has been fixed into place, then the optimization is complete.

What I claim is:

1. A method of managing access control lists used in controlling electronic communications between distributed computerized network components by utilizing at least one user electronic interface to at least one programmable control unit, said programmable control unit having an executable, interpretable, assembled, or assemblable program therein for comparing access control entries in access control lists to other access control entries in the same list and including user input capability comprising the steps of:
   a. Selecting an access control list via said user input capability;
   b. Comparing each access control entry in said access control list with other access control entries in said access control list to determine if said access control entry is forwardly redundant, backwardly redundant, shadowed, or conflicted;
   c. iteratively repeating as often as necessary step b until all forwardly redundant, backwardly redundant, shadowed, or conflicted access control entries are found, further comprising optimization of said access control lists wherein said optimization comprises the steps of:
      i. defining a representative communication packet sample for processing by an access control list;
      ii. recording the number of times each access control entry in said access control list matches a packet contained in said packet sample;
      iii. ordering the access control entries in said access control list in descending order according to the number of said matches corresponding to each access control entry without changing the control functionality of the access control list.

2. The method as defined in claim 1 wherein said packet sample is generated from a stream of prior communication over the distributed communication network.

3. The method as defined in claim 1 wherein the packet sample is a stream of packets from an online networking device input substantially concurrently with the flow of said packets across said network.

4. The method as defined in claim 1 wherein some or all forwardly redundant, backwardly redundant, shadowed, or conflicted access control entries are displayed to the user via a display output device.

5. The method as defined in claim 1 wherein some or all forwardly redundant, backwardly redundant, shadowed, or conflicted access control entries are deleted from said access control list.

* * * * *